US008801867B2

(12) United States Patent
Besemer et al.

(10) Patent No.: US 8,801,867 B2
(45) Date of Patent: Aug. 12, 2014

(54) METHOD FOR CLEANING FILTER MEMBRANES

(75) Inventors: Arie Cornelis Besemer, Amerongen (NL); Elmar Van Mastrigt, Almelo (NL); André Mepschen, Oosterhesselen (NL)

(73) Assignee: X-Flow B.V., Enschede (NL)

( * ) Notice: Subject to any disclaimer, the term of this patent is extended or adjusted under 35 U.S.C. 154(b) by 0 days.

(21) Appl. No.: 12/693,763

(22) Filed: Jan. 26, 2010

(65) Prior Publication Data

US 2010/0237012 A1 Sep. 23, 2010

Related U.S. Application Data

(63) Continuation of application No. PCT/NL2008/050485, filed on Jul. 16, 2008, and a continuation-in-part of application No. 12/652,893, filed on Jan. 6, 2010, now Pat. No. 8,227,396, which is a continuation of application No. PCT/NL2008/050488, filed on Jul. 16, 2008.

(30) Foreign Application Priority Data

Jul. 31, 2007 (NL) .................................... 2000790
Jul. 31, 2007 (NL) .................................... 2000791

(51) Int. Cl.
  *B08B 3/14* (2006.01)
(52) U.S. Cl.
  USPC .......... 134/42; 134/2; 134/3; 134/10; 134/26; 134/27; 134/28; 134/29; 134/30; 134/34; 134/36; 134/41; 510/367; 510/375; 210/321.69; 210/636; 210/753; 210/758; 210/759; 210/905
(58) Field of Classification Search
  USPC ......... 134/2, 3, 10, 26, 27, 28, 29, 30, 34, 36, 134/41, 42; 510/367, 375; 210/321.69, 636, 210/753, 758, 759, 905
  See application file for complete search history.

(56) References Cited

U.S. PATENT DOCUMENTS

| | | | |
|---|---|---|---|
| 3,326,747 A * | 6/1967 | Ryan et al. .................... 424/667 |
| 5,185,096 A * | 2/1993 | Ahmed ......................... 510/221 |
| 5,336,416 A * | 8/1994 | Antelman ...................... 210/764 |
| 5,441,665 A | 8/1995 | Massaioli | |
| 5,714,407 A * | 2/1998 | Maeno et al. ................. 438/701 |
| 5,747,658 A * | 5/1998 | Veelaert et al. .............. 536/18.5 |
| 6,538,132 B1 | 3/2003 | Besemer et al. | |
| 2002/0077035 A1 | 6/2002 | Wang et al. | |
| 2005/0028845 A1 | 2/2005 | Labib et al. | |
| 2005/0184008 A1 * | 8/2005 | Schacht et al. ............... 210/636 |
| 2005/0272625 A1 * | 12/2005 | Labib ........................... 510/407 |
| 2006/0289034 A1 * | 12/2006 | Small et al. ................... 134/1.3 |
| 2007/0056904 A1 * | 3/2007 | Hogt et al. .................... 210/636 |
| 2009/0281016 A1 * | 11/2009 | Cooper et al. ................ 510/176 |

FOREIGN PATENT DOCUMENTS

| | | |
|---|---|---|
| DE | 19503060 | 8/1996 |
| EP | 0118983 | 8/1989 |
| EP | 1341717 | 5/2004 |
| JP | 04-267933 | 9/1992 |
| JP | 4267933 | 9/1992 |
| WO | WO-97-45523 | 12/1997 |
| WO | WO-98-27118 | 6/1998 |
| WO | WO-98-45029 | 10/1998 |
| WO | WO-03-060052 | 7/2003 |
| WO | WO-03-095078 | 11/2003 |
| WO | WO-2006-012691 | 2/2006 |
| WO | WO-2006-015626 | 2/2006 |

OTHER PUBLICATIONS

Burke, S. D., et al., "Sodium Periodate", *Handbook for Reagents, Oxidation and Reduction*, ed. John Wiley & Sons, New York 2000, p. 440.
Fatiadi, Alexander J., "New Applications of Periodic Acid and Periodates in Organic and Bio-Organic Chemistry", *Synthesis*, 1974, pp. 229-272.
Floor, M., et al., "Hydrogen Peroxide as Co-Reactant in the Chlorite Oxidation of Dialdehyde Glucans", Chapter 7; *Recl. Trav. Chim. Pays-Bas*, 1989, pp. 97-121.
Guthrie, R. D., "The"Dialdehydes" from the Periodate Oxidation of Carbohydrates", *Advances in Carbohydrate Chemistry*, vol. XVI, ed. Associated Press, New York 1961, pp. 105-158.
Velaert, Sarah, "Dialdehyde Starch: Production, Properties and Applications", *Cannizarro Disproportionation discussion in Thesis*, Univ. of Gent, Belgium, 1995-1996, p. 88.

* cited by examiner

*Primary Examiner* — Bibi Carrillo
(74) *Attorney, Agent, or Firm* — Peacock Myers, P.C.; Jeffrey D. Myers

(57) ABSTRACT

A method for cleaning process apparatus used for production of liquids, especially for cleaning filters, for example membrane filters. The apparatus is contacted with a solution of periodate. It is especially preferred that the cleaning process is carried out at a temperature between 15 and 95° C.

6 Claims, No Drawings

METHOD FOR CLEANING FILTER MEMBRANES

CROSS-REFERENCE TO RELATED APPLICATIONS

This application is a continuation application of International Patent Cooperation Treaty (PCT) Application Serial No. PCT/NL2008/050485, entitled "A Method for Cleaning Processing "Equipment, Such as Filters"", to X-Flow B.V., filed on Jul. 16, 2008, which is a continuation application of Netherlands Patent Application Serial No. NL 2000790, to X-Flow B.V., filed on Jul. 31, 2007, and Netherlands Patent Application Serial No. NL 2000791, to X-Flow B.V., filed on Jul. 31, 2007, and this application is a continuation-in-part of U.S. Ser. No. 12/652,893, entitled "A Method for Cleaning Processing "Equipment, Such as Filters"", filed on Jan. 6, 2010, U.S. Pat. No. 8,227,396 which is a continuation of International Patent Cooperation Treaty (PCT) Application Serial No. PCT/NL2008/050488, entitled "A Method for Cleaning Processing "Equipment, Such as Filters"", to X-Flow B.V., filed on Jul. 16, 2008, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention

The invention relates to a method according to the preamble of claim 1. The invention especially relates to a method of cleaning processing equipment, in particular filters, such as membrane filters, which are used for producing liquid foodstuffs such as milk (products), fruit juices, beer, soft drinks (such as lemonades), cider, wine, sherry, port, distilled drinks and the like. These filters are contaminated during filtration processes.

2. Description of Related Art

In the food industry and sewage purification plants, use is being made to an increasing extent of membrane filters, in particular polymeric membranes such as, polysulphone, polyethersulphone (with or without polyvinylpyrrolidone) and certain types of polyamides, and ceramic membranes for removing insoluble matter from beverages and other liquids. Such membranes ensure an expedient removal of undesirable constituents, in particular micro-organisms such as algae, fungi, yeast, and bacteria (exudates).

However, the permeability of such membrane filters, also expressed as flux, decreases in the course of time and the membranes may become blocked even after a relatively short time, i.e. sometimes even within less than one hour, because components from the material to be treated are adsorbed or absorbed or precipitated on surfaces of the apparatus, which is undesirable. The consequence is that the process has to be stopped in order to clean the membranes. The blocked filters can be restored, for example by rinsing them through in the opposite direction, a process known as back-flushing. This can be seen as a mechanical solution. However, that is a complicated process and is only a temporary and not satisfactory solution, since after each step the initial flux (at the same trans membrane pressure) is lower than before and on long term the contamination accumulates to such an extent that the filter is completely blocked. Moreover, it is difficult to remove some persistent organic contaminants in this way.

BRIEF SUMMARY OF THE INVENTION

The invention is applicable to the cleaning of filters that are used for generally known processes, like the filtration of soft drinks, milk (products), wine, sherry, port, distilled drinks, fruit juices, lemonades, beer, such as settled beer, residual beer, but also the wort/spent grain separation, hot trub separation and cold trub separation.

In the case of brewing beer the invention relates to, inter alia, the apparatus used during the preparation of malt, the conversion of malt and/or unmalted grain into wort and the further processing of the wort, with or without addition of extra components, such as hops, by fermentation to beer, as well as all auxiliary apparatus used therewith and coming in contact with main or secondary streams from these processes.

There is therefore a need for an efficient cleaning system for cleaning apparatus for the production, as defined above, of liquid foodstuffs, which system is capable of providing a proper cleaning, which must preferably be performed within a relatively short time (preferably in less than 120 minutes) and during which substantially all contaminations are removed.

A further examination has revealed that the apparatus, and more in particular the filters, during the production become contaminated by a combination of all kinds of compounds, of which polysaccharides, oligosaccharides, proteins, β-glucans, fats and polyphenols are important components.

Further Description of Related Art:

Enzymatic processes have been proposed for cleaning membranes. Thus, the international patent application WO 98/45029 describes the use of cellulases and amylases for cleaning beer filtering membranes, after alkaline pre-treatment of the membrane. Similarly, the Japanese patent application JP-A 4-267933 describes the use of proteases and cellulases for cleaning separation membranes.

These non-oxidative processes, however, are usually not completely satisfactory because appreciable reaction times appear to be necessary to achieve an effective removal of said components.

The international patent application WO 97/45523 describes the use of 2, 2, 6, 6-tetramethylpiperidine-N-oxyl (TEMPO) as nitroxyl compound and hypochlorite or hypobromite as a reoxidizing agent for cleaning beer-settling modules. However, the presence of halogen residues, especially bromine residues, is highly undesired in equipment because of their corrosive character.

The international patent application WO 03/060052 describes a process in which filters can be cleaned in a bromine-free process by using a cyclic nitroxyl compound, such as TEMPO or its 4-acetamido or 4-acetoxy derivative and a halogen-free oxidizing system. The nitroxyl compound can be oxidized to the corresponding ion by enzymatic means with oxygen or hydrogen peroxide as co-substrate or by metal catalyzed oxidation in combination with peracids, such as peracetic acid, persulphuric acid (Caro's acid), permanganic acid or hydroperoxide.

Also, other oxidative methods are described. The international patent application WO 2006/012691 describes the generation of hydroxyl radicals to clean the membranes. This method is in particular suitable when the membranes are of the fluorinated polymer type and hence are highly inert towards chemical reagents.

The international patent application WO 03/095078 describes a method that also is based upon oxidation, which seems to be very effective when back flushing is applied, aimed to convert the polyphenols. This method is based upon the assumption that polyphenols adhere at first to the membrane surface and are responsible for the initiation of the fouling layer. However, from the data presented it appears that from the oxidation chemicals claimed, peracetic acid and hypochlorite and hydrogen peroxide with a manganese catalyst are effective.

DESCRIPTION OF THE INVENTION

The present invention is based upon the use of periodic acid or its salts as indicated in claim 1. The invention is based on the surprising insight that it is possible to adequately clean apparatus, for example filtration membranes and process equipment, used during the production of foodstuffs and clean water by exposing the fouled apparatus to a solution containing periodic acid ($H_5IO_6$) or its salts. The preferred material is sodium metaperiodate ($NaIO_4$). When dissolved in water, it reacts to yield salts, known as paraperiodates, to be considered as salts derived from $H_5IO_6$. The term "periodate" designated in this text includes all of these salts.

Surveys of the general use of periodate as an oxidizing agent are given in an article by Alexander J. Fatiadi, New Applications of Periodic Acid and Periodates in Organic and Bio-organic Chemistry, Synthesis, 229, 1974, and in the Handbook for reagents, Oxidation and Reduction, p. 440, Ed. S. D. Burke and R. L. Danheiser, John Wiley S Sons, New York (2000). One of the first publications of periodate, concerns the conversion of vicinal diols leading to bond cleavage and formation of two carbonyl groups (also known as the Malapradian oxidation). The general reaction is as follows:

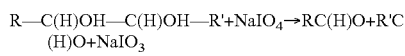

R—C(H)OH—C(H)OH—R'+NaIO$_4$→RC(H)O+R'C(H)O+NaIO$_3$

This reaction has found broad application. Especially in the field of all types of saccharides, the reaction has been widely explored (see for review articles Advances in Carbohydrate Chemistry, R. D. Guthrie, ed., Vol. XVI, page 105-158, 1961, Associated Press, New York). An important application was found in the preparation of dialdehyde starch and dialdehyde cellulose. Other groups of interest that can be oxidized by periodate are sulfides, resulting in sulfoxides, and dihydroxybenzenes resulting in quinones.

DETAILED DESCRIPTION OF THE INVENTION

A further explanation of the invention will be given by referring to the cleaning of apparatus used for the filtration of beer. From the main constituents of beer, reaction of periodate with polysaccharides is the most likely. Due to the addition of periodate reacting with polysaccharides, an abundance of aldehydes will be present. However, because of the presence of proteins, problems are to be expected, which may make the fouling process more severe. Also, proteins will react with aldehydes, for example originating from reducing sugar compounds present, in an equilibrium reaction. The product arising from the reaction with polysaccharides is the so-called dialdehyde polysaccharides. The Maillard reaction, taking place between sugars (aldehyde groups) and proteins (amino groups) may be (partly) responsible for the fouling of membranes. The resulting materials are highly crosslinked products from the reaction between aldehydes and alcohols, leading to hemiacetals or, at a higher oxidation level, to hemialdals, or are highly crosslinked protein-saccharide complexes. As a result of this cascade type reaction sequence one may expect that the fouling layer forms a film that is difficult to degrade. The reaction is due to condensation of the amine group with a carbonyl group. This primary reaction is reversible, but the products tend to rearrange according to the so-called Amadori rearrangement. These conditions products are stable.

Surprisingly, it has now been found that these problems can also be overcome by exposing the fouling layer to a periodate salt, preferably in the presence of a chemical able to further react with the products arising from the periodate reaction or followed by exposure to said chemicals, under neutral or alkaline conditions. A man skilled in the art would not tend to use a periodate compound, due to the cascade reactions indicated above. Although not bound by theory, it can be postulated that due to the neutral or alkaline conditions, which are usually not applied for the oxidation of polysaccharides with periodate, the oxidation is possibly followed by some positive side reactions. A first possible side reaction to be considered is the Cannizarro disproportionation (discussed by Veelaert, Thesis, p.88, 1995-1996, University of Gent, Belgium). Under influence of OH", two aldehyde groups react to give an alcohol (reduced form) and a carboxylic acid (oxidized) form. The net result (under these alkaline conditions according to the preferred embodiment of the present invention) is formation of carboxylate groups. As the final product is less crosslinked, it is expected that due to its higher solubility and charges, the product can be more easily removed.

A second possible side reaction is known as β-alkoxycarbonyl elimination, also named β-elimination. This reaction has been investigated by several authors. A survey of this reaction is presented in the reference mentioned above (Advances in Carbohydrate Chemistry, R. D. Guthrie, ed., Vol XVI, page 105-158, 1961, Associated Press, New York). Possible pathways for this reaction are discussed by Floor, et al. (Reel. Tray. Chim. Pays-Bas, 107 (1989) 384, and by Veelaert (Thesis, 1995-1996, University of Gent, Belgium). The main result of this reaction is that the polysaccharide based molecules are cleaved and that carboxylate containing materials are formed. These products are better soluble in water than the parent compounds and exhibit less adsorption.

A typical condition is an elevated temperature, for example >about 60° C., preferably >about 70° C., that makes it possible to perform a cleaning step within a relatively short time (<60 minutes). The concentration of periodate to be used is 500-2000 ppm. The consumption of the reagent can be monitored through UV-vis spectroscopy and the amount of reagent to be added can be based on this monitoring.

The membrane is after treatment completely restored and no further treatment with chemicals is necessary.

Despite the rigorous conditions applied (high temperature and high pH) the membranes appear to be stable.

A second embodiment of the invention concerns the regeneration of the reagent in situ.

Because periodate is an expensive chemical its application for large-scale processes is very limited. Large-scale recovery processes based upon electrochemical in situ regeneration are described in numerous patents and articles (a review is given in Starch, 7, 208 (1966) and in U.S. Pat. No. 5,747,658. Processes developed to recover the chemical after reaction based on sodium hypochlorite are described in Die Starke, 23, (1971) 42-45 and in U.S. Pat. No. 6,538,132 and are based on peroxomonosulphuric acid, and ozone, as described in European patent application EP 1 341 717 and by ozone (the international patent application WO 98/27118). This second embodiment is to perform the reaction with very limited amount of e.g. sodium periodate (<250 ppm=1.2 mM) in presence of a second oxidizing agent, able to oxidize the aldehyde groups arising by the action of periodate. It is seen as advantage that in this way the amount of the expensive periodate can be limited. Examples of such oxidizing agents are hydrogen peroxide and peroxodisulphate. Although not bound by theory, it is believed that the good cleaning effect of periodate combined with another oxidizing agent is due to oxidation of the products formed by periodate under the alkaline conditions of the process. This reaction is conducted at pH>6. As the oxidation of polysaccharides is preferably performed at pH 1-6 and dialdehyde polysaccharides are reactive under alkaline conditions, an in situ regeneration is not feasible. An improved process is described in European patent application EP 118 983. It has now been found that these regeneration methods can be applied under the alkaline conditions applied during the cleaning procedure of the present invention.

A third embodiment is to perform the reaction with very limited amount of periodate {<1.2 mM) in the presence of a reagent able to react with the products, such as peroxydisulphate, hydrogen peroxide, preferably at a relatively high pH value (about >6), resulting in degradation of the products by β-elimination and/or oxidation, or to conduct the oxidation at a lower pH value (about <6) followed by treatment with a reagent able to react with the products such as hydrogen peroxide, peracids, hypochlorous acid and sodium chlorite. Especially at lower pH (about <6) it may be advantageous to conduct the reaction in this way, because post-treatment will give highly soluble dicarboxy derivatives. Only limited amounts of periodate are necessary.

The process of the invention may be used for cleaning membrane filters used in food and feed industry and for water purification. Production of dairy products, beer, wine, fruit juices (apple, pine apple, grape fruit, oranges), vegetable juices and other beverages. The equipment includes pipes, tubes, mixing devices. The filter type may be of any type including those which are made of PVP, polysulphone, polyether-sulphone and especially polyamides and ceramic membranes.

The process of the invention may proceed by oxidation affording a better solubilization and/or degradation of polysaccharides and proteins. The process can be conducted as a static (batch-wise) process. The time needed for cleaning is preferably between 5 minutes and 120 minutes.

Also a continuous or semi-continuous process is possible, where the liquid is circulated through the system. After cleaning the chemical aid can be removed by rinsing with a suitable liquid, which is preferably water.

The pH value in the Examples 1, 2, 4, 6 and 7 is between about pH 11 and 13.

EXAMPLES

General

The membranes used are of the hollow-fibre type, made of polyethersulphon/PVP-type; 20 fibres with a length of 300 mm are enclosed in a module, having a surface-area of 0.0235 $m^2$. Beer is pumped through the fibres at a starting pressure of 1 bar.

1. Standard fouling procedure for membranes Beer with a temperature of 0 (±1) ° C. is filtered through the membranes at a constant flux of 107 $l.m^{-2}.hr^{-1}.bar^{-1}$ under cross flow conditions (speed 2 m/s). The procedure is continued until the trans-membrane pressure is higher than 1.6 bar (usually this takes 4 hours). After fouling the clean water, the flux is 7500-15000 $l.m^{-2}.hr^{-1}.bar^{-1}$.

2. Washing steps before and/or after the oxidative cleaning step (for example with periodate, periodate/persulphate, iodate/permanganate) may comprise one or more of the following procedures:

a. A back water flush consisting of the following steps: back flush with reversed osmosis water during 20 seconds, followed by flushing with 0.01 M NaOH solution during 180 seconds, and finally with RO water 140 seconds;

b. Alkali treatment, performed with a NaOH-solution at pH 12 and 60° C.;

c. Acid treatment, performed with nitric acid at pH 2 during 10 minutes at room temperature d. (alternative) oxidative treatment is performed with hydrogen peroxide and NaOH.

The flux of a never-used membrane module is 50,000-55,000 $l.m^{-2}.hr^{-1}.bar^{-1}$.

Hereinafter examples of the invention will be given, without limiting the scope thereof. The determination of the clean water flux in each Example, at the same time also forms a clean water wash step. The time during which the cleaning step with periodate solution is performed in the Examples amounts to about 45 minutes, unless otherwise indicated. If this time is increased, the concentration of the periodate solution can be decreased. Generally speaking, the lowest workable concentration of the periodate solution is about between $8*10^{-5}$-0.5 M. The concentration of a regenerating agent (oxidizing agent like hypochlorite, hypobromite or a peracid) generally ranges from $2*10^{-4}$-2 M, preferably from $5*10^{-4}$-2 M.

Example 1

Cleaning with Periodate/Sodium/Hydroxide

A fouled membrane is cleaned by a back-flush as described above. The clean water flux after this treatment is 10,000 $l.m^{-2}.hr^{-1}.bar^{-1}$. Then through the module a solution containing periodate (0.024 M) and sodium hydroxide (0.04 M) is circulated. The temperature of the solution is maintained at 70° C. during the whole procedure. After 45 minutes the module is removed and washed with an alkaline solution. The clean water flux after this treatment is 49,000 $l.m^{-2}.hr^{-1}.bar^{-1}$.

Example 2

Cleaning with Periodate/Sodium Hydroxide/Sodium Perdisulphate

Through a fouled membrane module, precleaned through a back flush, an aqueous solution containing periodate (0.46 mM), sodium perdisulphate (0.008 M) and sodium hydroxide (0.11 M) is recirculated. The temperature of the treatment is maintained at 70° C. throughout the whole procedure. After 45 minutes the module is removed from the solution. The clean water flux after this treatment is 48,800 $l.m^{-2}.hr^{-1}.bar^{-1}$.

Example 3

Cleaning with Periodate at pH 3

Through a fouled membrane module, precleaned through a back flush, an aqueous solution of periodate (9.4 mM) is circulated at 25° C. at pH 3. After 45 minutes exposure, the module is removed from the solution and washed with an alkaline solution. The clean water flux after this treatment is 48,800 $l.m^{-2}.hr^{-1}.bar^{-1}$.

Example 4

Cleaning with Iodate/Permanganate

A fouled membrane is cleaned by a back flush as described above. The clean water flux after this treatment is 9,700 $l.m^{-2}.hr^{-1}.bar^{-1}$. Then the module is cleaned by circulating a solution containing iodate (1.2 mM) and also containing potassium permanganate (0.032 M) and NaOH (0.08 M). The temperature of the solution is maintained at 60° C. After 45 minutes the membrane is washed with a solution containing ascorbic acid (0.5%) and oxalic acid (0.5%) to remove manganese dioxide ($MnO_2$). The clean water flux after this treatment is 48.500 $l.m^{-2}.hr^{-1}.bar^{-1}$.

Alternatively, this method can be performed using a combination of iodate and monoperoxopersulphate, wherein the amounts of these compounds that are required to obtain analogous results can be adequately chosen by a man skilled in the art.

Example 5

Cleaning with Sodium Iodate and Persulphate

Through a fouled membrane module, precleaned through a back-flush, an aqueous solution of iodate (0.010 M) and 0.011 M NaOH is circulated at a temperature of 70° C. at pH 7.

After 45 minutes exposure, the module is removed from the solution and washed with an acid solution. Then, the clean water flux is 16,000 $l.m^{-2}.hr^{-1}.bar^{-1}$. This implies that iodate does not contribute to the cleaning and that the cleaning as described in Examples 1-4 are attributable to the action of periodate.

Example 6

Cleaning with Periodate/Sodium Hydroxide/Hydrogen Peroxide

Through a fouled membrane module, precleaned through a back flush, an aqueous solution containing periodate (1.2 mM), sodium hydroxide (0.11 M) is recirculated. During the cleaning procedure hydrogen peroxide is dosed (total amount 45 mmol/liter). The temperature of the treatment is maintained at 70° C. throughout the whole procedure. After 45 minutes the module is removed from the solution. The clean water flux after this treatment is 40,700 $l.m^{-2}.hr^{-1}.bar^{-1}$.

Example 7

Cleaning with Periodate/Sodium Hydroxide

The procedure as described in Example 6 was repeated, however without addition of hydrogen peroxide. The clean water flux after this treatment is 34,200 $l.m^{-2}.hr^{-1}.bar^{-1}$.

What is claimed is:

1. A method for cleaning organic matter fouled filter equipment, wherein the method comprises the steps of:
   (a) providing filter equipment fouled with organic matter comprising polysaccharides and proteins from the production of liquid foodstuffs,
   (b) contacting the fouled filter equipment with a first oxidizing agent comprising a solution of a periodate compound under alkaline conditions, wherein the polysaccharides react with the periodate compound to form aldehydes,
   (c) after step (b), oxidizing the aldehydes with a second oxidizing agent selected from the group consisting of hydrogen peroxide and peroxydisulphate, and
   (d) removing the organic matter from the filter equipment.

2. A method for cleaning filter equipment according to claim 1, wherein the periodate compound in (b) is used in a concentration of $8\times10^{-5}$-0.5 moles/liter.

3. A method for cleaning filter equipment according to claim 1, wherein the periodate compound in (b) is used in a concentration between about 2 and about 9 millimoles/liter.

4. A method for cleaning filter equipment according to claim 1, wherein the filter equipment is a membrane filter.

5. A method for cleaning filter equipment according to claim 1, wherein contacting the equipment with the solution of the periodate compound is performed at a temperature of >60° C.

6. A method of cleaning filter equipment according to claim 1, wherein contacting the equipment with the solution of the periodate compound is performed at a temperature of >70° C.

* * * * *